Jan. 21, 1936.     H. C. LORD     2,028,549
MOUNTING
Filed Jan. 25, 1932     2 Sheets-Sheet 1

INVENTOR.
Hugh C. Lord

Jan. 21, 1936.    H. C. LORD    2,028,549
MOUNTING
Filed Jan. 25, 1932    2 Sheets-Sheet 2
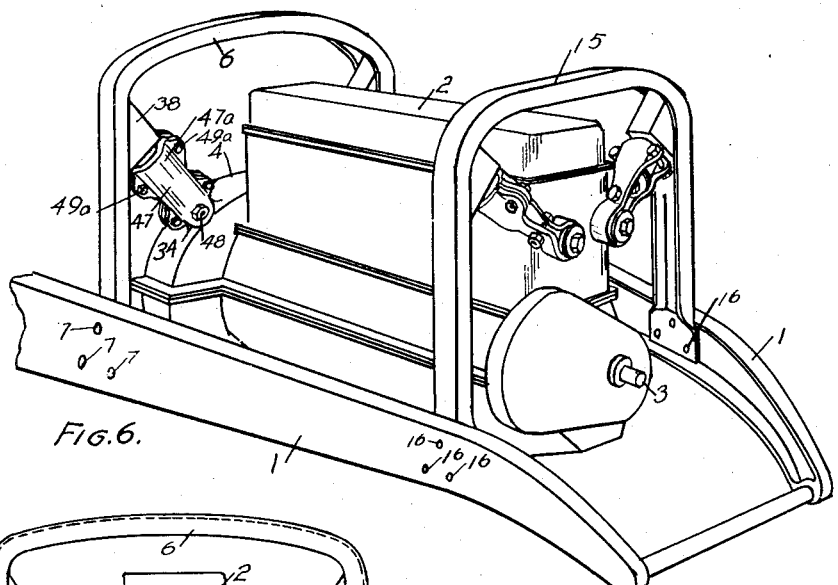
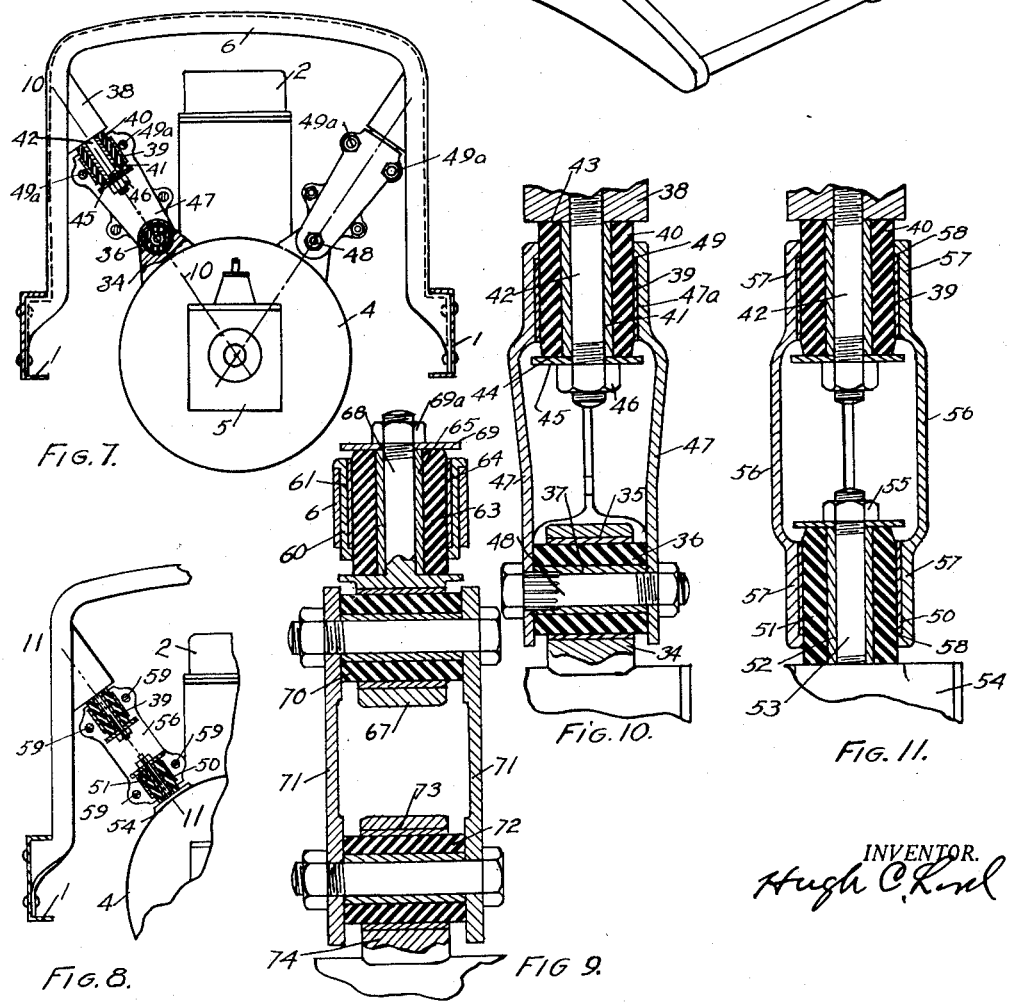
INVENTOR.
Hugh C. Lord Patented Jan. 21, 1936

2,028,549

UNITED STATES PATENT OFFICE 2,028,549

MOUNTING

Hugh C. Lord, Erie, Pa.

Application January 25, 1932, Serial No. 588,685

30 Claims. (Cl. 248—7)

The present invention is designed to provide a mounting for vibrating instruments. It is particularly effective for instruments having torque impulses, such, for example, as an automobile engine and as exemplified it is shown as applied to an automobile. In very many environments, the vibrations communicated to the surrounding parts, such as the body of an automobile, are very objectionable. Such vibrations not only include the torque impulses, but include also vibrations as to unbalanced conditions and reciprocation of parts where there are such reciprocating parts. In the present invention the torque impulses, as well as the unbalanced vibrations are simply and effectually absorbed. Features and details of the invention will appear from the specification and claims.

A preferred embodiment of the invention is illustrated in the accompanying drawings as follows:—

Figure 1:
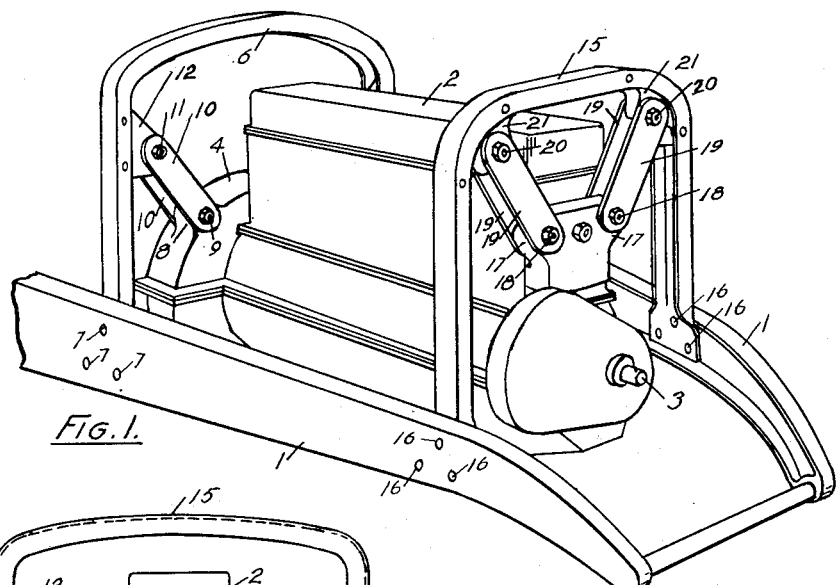

Fig. 1 shows a perspective view of an automobile engine mounted in accordance with the invention.

Figure 2:
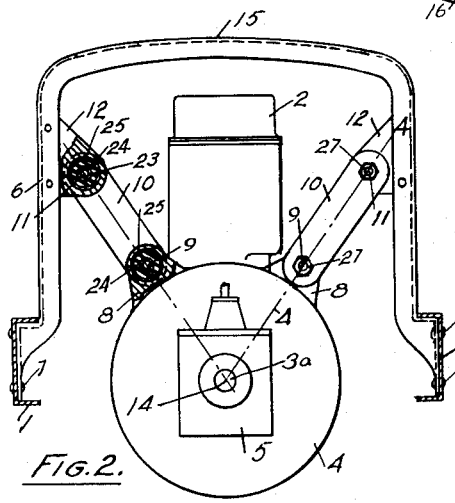

Fig. 2 a rear elevation of the engine showing the rear mountings.

Figure 3:
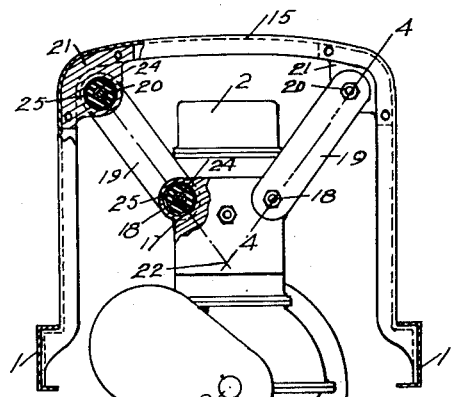

Fig. 3 a front elevation of the engine.

Figure 4:
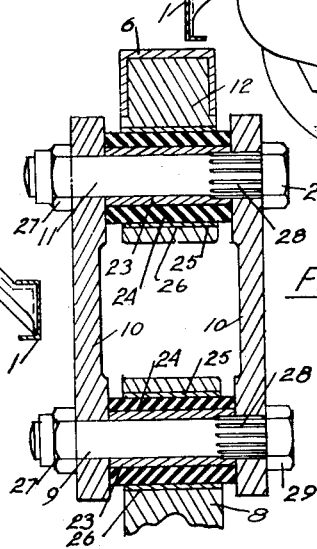

Fig. 4 a section through the mountings on the lines 4—4 in Figs. 2 and 3.

Figure 5:
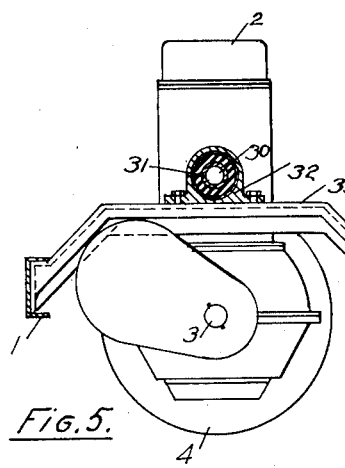

Fig. 5 a view of a modified structure.

Fig. 6 a perspective view of an engine mounted with a modification of the mounting structure.

Fig. 7 a rear elevation of the engine, one of the link supports being in section.

Fig. 8 a rear elevation of a modification, the link structure being in section.

Fig. 9 a sectional view showing a further modification of link structure.

Fig. 10 a section on the line 10—10 in Fig. 7.

Fig. 11 a sectional view of the link structure showing a further modification.

1 marks the side frames of the automobile, 2 the engine, 3 the crank shaft of the engine, 4 the bell housing, and 5 the transmission case. These are of ordinary construction. A U-shaped cross member 6 extends across the frame at the rear of the engine. This is secured by rivets 7 to the side members of the frame. In some instances this cross member may follow the general contour of the dash (not shown), in fact, may be incorporated with it. Brackets 8 extend from the bell housing at each side of the engine. Joints having joint pins 9 extend through these brackets. Shackle links 10 are secured to the pins 9 and extend to pins 11 of rubber joints arranged in a bracket 12. These links converge so that the line through the axes of the joints having the pins 9 and 11 have a focal point, as 14, at the desired center of oscillation of the engine. This at the rear may be at the axis of the shaft 3a extending from the transmission in line with the crank shaft.

Arranged at the front of the engine a cross member 15 is provided. This is preferably of U-form extending upwardly and secured to the side frames by rivets 16. Brackets 17 extend from the engine and pins 18 extend from rubber joints secured in the brackets. Links 19 extend from the pins 18 to pins 20 in rubber joints secured in brackets 21 on the outer upper corners of the cross member 15. The line through the axes of the pins 18 and 20 converge to a focal point 22, which focal point is on the axis of oscillation of the engine. This line of oscillation may pass through the center of gravity of the engine, if desired, and, as shown, approximates this condition.

Each of the link structures is, or may be, identical, or the link of one may be slightly shorter than the other, but each has the same general construction and the section 4—4 is shown of such a structure. The rubber joints comprise a central sleeve 23, a bushing 24 of rubber, an outer shell 25 around the rubber, the shell being shorter than the sleeve. The rubber is preferably bonded to the outer shell and the inner sleeve, in accordance with my Patent #1,452,693, putting the rubber, during vulcanization, under initial tension through the cooling of the rubber after vulcanization. The outer shell is pressed into an opening 26 in the brackets. The pins 9 and 11, or 18 and 20 extend through the shackle links 10, or 19 and through the sleeves. The pins are in the form of ordinary bolts with nuts 27 and are provided with axially extending serrations 28. These serrations are formed next the head 29 of the bolt so that as the bolts are drawn in the serrations cut into the walls of the links and into the walls of the sleeve, locking the sleeve and the links against turning relatively to each other.

In the operation of the device, the torque impulse exerted by the engine tends to rock the engine, the links swinging to accommodate this rocking movement. For a limited movement each side of the neutral position the engine swings on very nearly a fixed axis at the points 14 and 22. As the swinging movement is extended the engine is raised slightly, the raising movement increasing as the swinging action increases, but for the vibration range the lifting movement of the engine is very slight. The axial position of the points 14 and 22, except for the slight movement referred to, is definitely located and maintained by the linkage. The rubber joints, as the engine is rocked, are swung through the link and the rubber accommodates the motion through the distortion of the rubber. This circumferential movement of the shell relatively to the sleeve puts the rubber circumferentially in shear and this action on the rubber resists the rocking movement and consequently yieldingly holds the engine against the torque thrust. If desired, the engine may be rocked back of the neutral point before the joints are locked by the serrations of the pins so that under the initial impulse of the engine it will be swung toward the upright position, thus overcoming this initial offsetting and giving to the engine at its neutral, or directly upright position, an initial resistance against the torque.

It will be noted that with this structure any axial line of oscillation may be chosen, as desired. It may be made coincident with the axis of the crank shaft by merely arranging the links with their focal points at the axis of the crank shaft. It will be noted that this arrangement and control of the axis may be had without any embarrassment as to the point of support, or the attached parts of the engine. It will also be noted that it provides a means whereby the engine is completely under-slung and can be readily removed by disengagement of the links. It will be noted that the engine is hung on the links, the weight of the engine being carried by a tension pull on the links, thus simplifying the structure and permitting the use of a very light structure. Preferably the attachment of the links to the engine is somewhat above the center of gravity and materially above the axis of rotation. The preferred convergence of the links is approximately 45°, but it may be varied from this to some extent. The length of the links may be varied, the longer the links the less lifting of the engine with a given rocking movement. Under some conditions, it may be desirable to utilize the lifting of the engine to cushion, or retard, extreme vibrations. Under these conditions, the links may be made comparatively short.

The joints which are put under strain by the oscillation of the engine may be made sufficiently large, either in length, or diameter, to provide such torque resistance as may be desired. This proportioning is true not only of the structure shown in Figs. 1 to 4, but in the remaining structures hereinafter described. It may be more economical, under some conditions, to supply auxiliary means for resisting the torque reaction.

In Fig. 5 I have shown a modification in which the front end of the engine is provided with a pin 30 which extends through a sleeve 31 of a rubber joint, the rubber joint being carried in a bracket 32 secured on a cross member 33. The axis of this joint will form, with the focal point of the links at the rear of the engine, the axis of oscillation for the engine.

In the structures described, the joints being under initial tension carry the load of the engine, providing the joints are of proper size with the rubber in tension and this gives a fair cushion to absorb vibrations incident to unbalanced conditions, or reciprocating parts. A more effective response to such unbalanced conditions, or other vibrations may be accomplished by carrying the load by a mounting in which the rubber is subjected to shear, in accordance with the general scheme illustrated and described in my Patents #1,830,118, Nov. 3, 1931, and #1,778,503, Oct. 14, 1930.

In the modified structure shown in Figs. 6, 7 and 10, a bracket 34 is secured to the bell housing and this is provided with a sleeve 35. A rubber joint 36, similar to the joint shown in Fig. 1, is pressed into this sleeve, the rubber element being preferably under tension and the joint being provided with an inner sleeve 37. A bracket 38 is fixed on the cross member 6 and a mounting is secured to this bracket. This mounting has an outer shell 39, a rubber bushing 40, and an inner member 41. A stud 42 extends through the inner sleeve. At the upper end of the mounting a snubbing end 43 is provided which operates against the end of the bracket. At the lower end a snubbing end 44 of rubber operates against a washer 45 and increases the resistance to movement beyond the normal vibration range. These snubbing ends are formed with relation to the weight and in accordance with the general description of my Patent #1,830,118. A nut 46 clamps the washer 45 and the mounting in place. Links 47 are formed from stampings, the lower ends of the links being perforated and bolts 48 clamp these links against the ends of the sleeve 37. The upper ends of the links are formed into half sleeves 47a with a shoulder 49 engaging the upper end of the sleeve 39. These sleeve portions 47a are clamped together by bolts 49a which clamp the joint between the halves of the link. In this structure, the swinging movement is taken up by direct rotary movement on the lower joint and a pivotal movement of the upper mounting on a cross axis. This swinging of the upper mounting is, or may be, made greater, or less by varying the thickness of the wall of rubber and may be used in effecting a more definite resistance to the torque movement of the engine. A very definite advantage, however, of this arrangement of the upper mounting is that it carries the weight through the shear on this mounting and in this way the very desirable period of such a mounting may be utilized and the structure made very much more sensitive to vibrations incident to unbalanced conditions and to vibrations incident to reciprocating parts.

In the modified structure shown in Fig. 11, both joints at the ends of the links are arranged with their axes lengthwise of the links. The upper mounting is identical with the mounting shown in Figs. 1 to 10. An exactly similar mounting is secured on the bell housing, or engine block 54. This mounting has a sleeve 50, a rubber bushing 51 and an inner sleeve 52 in exactly the form of the mounting at the upper end, as shown in Fig. 10. A stud 53 extends from the block 34 through the central sleeve and is secured by a nut 55. Side links 56 have the half sleeves 57 at the top and bottom with shoulders 58 engaging the ends of the outer shells 39 and 50. The links are secured together by bolts 59 clamping the mountings in place. These mountings both operate in shear and both are provided with the snubbing ends and accommodate the rotative torque responses through the cross swinging of the mountings on their axes.

In the modification shown in Fig. 9, a bracket 60 is secured on the cross member 6, or 15, as the case may be and this bracket is provided with a socket 61. A mounting 62, similar to the mounting at the upper end of Fig. 10 is arranged in this socket. This mounting has a rubber bushing 63, an outer shell 64 and an inner sleeve 65.

A sleeve block 67 has an extending pin 68. This pin projects through the sleeve 65 and a snubbing washer 69 at the upper end. A nut 69a clamps the parts together and the block 67 has a base forming a snubbing end for the extending rubber. A joint 70, similar to the joints of the structures shown in Figs. 1 to 4 is mounted in the sleeve of the block 67. Links 71 are secured to the joint 70 and extend to a joint 72 similar to the lower joint in Figs. 1 to 4. This lower joint is secured in a sleeve 73 in a bracket 74, the brackets being carried by the engine block, or bell housing, as the case may be. This lower linkage and the joints correspond exactly to the joints and linkage in the structure shown in Fig. 1. In this joint I have the free oscillatory movement of the joints 70 and 72 taking the rotative movement in response to torque thrusts entirely in a rotative direction and I have a mounting carrying the load in shear and responding to and absorbing the vibrations incident to unbalance and vibrating parts.

One of the advantages of the link system of mounting resides in the convenience of attachment to the engine. The supports may be placed anywhere lengthwise of the engine as may be most convenient and the links inclined to enforce an axis of oscillation on the line desired. The attachment to the engine crosswise of the engine may be close to, or remote from, the vertical center of the engine. Ordinarily a convenient point of connection at the rear of the engine would be just outside the sides of the engine, but the point may be at the outside of the bell housing, if desired, or to the rear side of the bell housing, or on the transmission. Similarly the front connection may be on the front face of the engine blocks and close to the vertical center of the engine, or at points spaced from the sides of the blocks, as may be most convenient. The mounting, therefore, while having general application is of peculiar advantage in the mounting of engines for automobiles in that the frame requirements, control and other arrangements of the engine, give it special advantages in that the choice of location is very largely optional.

While I have shown the link connection in its preferable relation, that is, in a form in which the load is suspended by the links it will be understood that in the broader phases of the invention this arrangement of links is not necessary, the arrangement and placing of links in many environments being controlled by the convenience in positioning the supports.

While I have shown the links arranged with the ends connected with the engine, or vibrating unit nearest the focal point this relation is not essential in the broader aspects of the invention so long as the links converge toward the desired focal point. The swinging connectors between the engine and frame as specifically shown are in the form of rigid links with pivots at each end of the link. I do not wish, however, to be limited in the broadest phases of the invention to a swinging connector having a rigid body, or to a pivot formed independently of the body of the connector.

What I claim as new is:—

1. A mounting between a unit subjected to torque induced vibration and a support including relatively inclined swinging connectors between the unit and support converging toward the axis of vibration, said connectors being rubber cushioned and some of the cushions at least so constructed and arranged as to yieldingly resist the swinging movement of the connectors.

2. A mounting between a unit subjected to torque induced vibration and a support including relatively inclined swinging connectors between the unit and the support, converging toward the axis of vibration, each connector being provided with a rubber cushion interposed in such swinging connection.

3. A mounting between a unit subjected to torque induced vibration and a support including relatively inclined swinging connectors between the unit and the support converging toward the axis of vibration, said connectors being provided with rubber cushions at each end so constructed and arranged as to yieldingly resist the oscillatory movement of the vibrating unit.

4. A mounting between a unit having oscillatory vibration about an axis and a support including relatively inclined converging swinging connectors between the unit and the support, said connectors having rubber cushions so constructed and arranged as to respond to endwise thrusts on the connectors through a shear stress of the rubber.

5. A mounting between a unit having oscillatory vibration about an axis and a support including relatively inclined converging swinging connectors between the unit and the support, said connectors having pivotal rubber cushions between the connectors and the unit and support, some of said cushions being so constructed and arranged as to respond to endwise thrusts on the connectors through a shear stress of the rubber.

6. A mounting between a unit having oscillatory vibration about an axis and a support including relatively inclined converging swinging connectors between the unit and the support, said connectors having pivotal rubber cushions at each end of the connectors so constructed and arranged as to respond to endwise thrusts on the connectors through a shear stress of the rubber.

7. A mounting between a unit having oscillatory vibration about an axis and a support including relatively inclined converging swinging connectors between the unit and the support, said connectors having pivotal rubber cushions between the connectors and the unit and the support, some of the cushions having the rubber so constructed and arranged as to respond to endwise thrusts on the connectors through a shear stress of the rubber and some of the cushions having the rubber so constructed and arranged as to yieldingly resist the oscillatory movement.

8. A mounting between a unit having oscillatory vibration about an axis and a support including relatively inclined converging swinging connectors between the unit and the support, said connectors being provided with rubber cushions at each end of said connectors, the rubber of the cushion at one end of each connector being so constructed and arranged as to respond to the oscillatory movement through shear distortion of the rubber.

9. A mounting between a unit having oscillatory vibration about an axis and a support including relatively inclined converging swinging connectors between the unit and the support, said connectors having rubber cushions at each end of said connectors, the rubber of the cushion at one end of each connector being so constructed and arranged as to respond to the oscillatory movement through shear distortion of the rubber and the cushions at the opposite ends of the connectors having the rubber so constructed and arranged as to respond to other conditions through shear of the rubber.

10. A mounting between a vibrating unit and a support including relatively inclined converging swinging connectors between the unit and support, said connectors having pivotal connections at least at one end formed of rubber so constructed and arranged as to carry endwise thrusts of the connectors by tension stress of the rubber.

11. A mounting between a unit having oscillatory vibration about an axis and a support including relatively inclined converging swinging connectors between the unit and support, said connectors having pivotal connections at each end of the connectors, said connections being formed of rubber so constructed and arranged as to absorb pivotal movement through the distortion of the rubber, one of the connections for each link being provided with a bushing with its axis in the general direction of its oscillation and the other of said connections comprising a bushing with its axis in a direction to respond axially to an endwise thrust of the connector.

12. A mounting between a unit having oscillatory vibration about an axis and a support including relatively inclined converging swinging connectors between the unit and support, each connector having a rubber bushing with its axis in a direction to respond axially to an endwise thrust of the connector.

13. A mounting between a unit having oscillatory vibration about an axis and a support including relatively inclined converging swinging connectors between the unit and support, each of said connectors having a rubber bushing with its axis in a direction to respond axially to an endwise thrust of the connector, said rubber being so constructed and disposed to arrest an abnormal movement through the bushing.

14. A mounting between a unit having oscillatory vibration about an axis and a support including relatively inclined converging swinging connectors between the unit and support, said connectors having pivotal connections at their ends having axes in the general direction of the axis of oscillation, and a cushioning mounting forming a base for one of the pivotal connections of each connector having the rubber so constructed and arranged as to respond to endwise thrusts on the connectors through a shear stress of the rubber.

15. A mounting between a unit having oscillatory vibration about an axis and a support including relatively inclined converging swinging connectors between the unit and support, pivotal connections at the ends of the connectors having axes in the general direction of the axis of oscillation, and a cushion for each of the connectors comprising a rubber bushing having its axis crosswise of the axis of oscillation and so constructed and arranged as to respond to endwise thrusts on the connectors through shear stress of the rubber.

16. A mounting between a unit subjected to torque induced vibration and a support including two sets of relatively swinging connectors between the unit and support converging toward the axis of vibration, said connectors being pivotally connected at least at one end of each connector, said connectors in each set controlling the axis of oscillation and the path of movement of the vibrating unit.

17. A mounting between a unit subjected to torque induced vibration and a support including two sets of relatively swinging connectors between the unit and support converging toward the axis of vibration, said connectors being pivotally connected at both ends of each connector, said connectors in each set controlling the axis of oscillation and the path of movement of the vibrating unit.

18. A mounting between a unit having torque induced oscillatory vibration about an axis and a support including two sets of relatively inclined swinging connectors converging toward the oscillatory axis, each connector having a rubber cushion so constructed and arranged as to yieldingly resist the swinging movement of the connector.

19. A mounting between a unit subjected to torque induced vibration and a support including two sets of relatively inclined swinging connectors between the unit and support converging toward the axis of vibration, one end at least of each connector having a pivotal connection comprising a rubber cushion interposed in such pivotal connection.

20. A mounting between a unit having torque induced oscillatory vibration about an axis and a support including two sets of relatively inclined swinging connectors converging toward the oscillatory axis, said connectors being provided with rubber cushions at each end, the rubber of such cushions being so constructed and arranged as to yieldingly resist the oscillatory movement.

21. A mounting between a unit having oscillatory vibration about an axis and a support including two sets of relatively inclined converging swinging connectors between the unit and support, each connector having a pivotal cushion at least at one end, said cushions being so constructed and arranged as to respond to endwise thrusts on the connectors through a shear stress of the rubber.

22. A mounting between a unit having oscillatory vibration about an axis and a support including two sets of relatively inclined converging swinging connectors between the unit and support, said connectors having a pivotal rubber cushion at least at one end of each connector so constructed and disposed as to respond to the oscillatory movement through shear distortion of the rubber.

23. A mounting between a unit having oscillatory vibration about an axis and a support including two sets of relatively inclined converging swinging connectors between the unit and support, each connector having a rubber cushion at each end of the connector, one of the rubber cushions of each connector having the rubber so constructed and arranged as to take the oscillatory movements of the vibrating member in shear and the other cushion of each connector being so constructed and arranged as to respond to endwise thrusts of the connector through shear stress of the rubber.

24. A mounting between a unit having oscillatory vibration about an axis, said unit having a rotating element, and a support, the axis of oscillation being non-coincident with the axis of rotation of the rotating element, said axes intersecting each other approximately at the point of power connection of the rotating element including two sets of relatively inclined converging swinging connectors between the unit and its support, said connectors of each set converging toward the axis of oscillation.

25. A mounting between an automobile engine subjected to torque induced vibration and a supporting frame including relatively inclined swinging connectors converging downwardly from the frame toward the axis of torque-induced oscillation of the engine.

26. A mounting between an automobile engine subjected to torque induced vibration and a supporting frame, the engine having an engine shaft said mounting including pairs of relatively inclined swinging connectors converging toward the axis of oscillation, said axis being inclined to the axis of the engine shaft, said pairs being spaced lengthwise of the engine.

27. A mounting between an automobile engine subjected to torque induced vibration and its supporting frame including relatively inclined converging swinging connectors between the engine and the frame and extending from the frame toward the mass of the engine and its axis of torque induced vibration.

28. A mounting between an oscillatory vibrating unit and a support including, relatively inclined, converging, swinging connectors between the unit and support, each connector having a pivotal connection at least at one end of the connector, comprising a rubber bushing having its axis in the general direction of the axis of oscillation and bonded at its outer and inner periphery to the parts connected, said bushing being under initial tension.

29. A mounting between an oscillatory, vibrating unit and a support including pairs of relatively inclined, converging, swinging, connectors between the unit and support, and spaced axially along the unit, each connector having a pivotal connection at least at one end of the connector, comprising a rubber bushing having its axis in the general direction of the axis of oscillation and bonded its outer and inner periphery to the parts connected, said bushing being under initial tension.

30. A mounting between a unit subjected to torque-induced vibrations and a support including relatively inclined converging swinging connectors between the unit and support converging toward the axis of vibration and carrying the gravity load with the connectors in tension, the connectors having pivotal rubber cushions at least at one end.

HUGH C. LORD.